US007225050B2

(12) United States Patent
Sutula, Jr.

(10) Patent No.: US 7,225,050 B2
(45) Date of Patent: May 29, 2007

(54) METHOD AND APPARATUS FOR PRECISELY FITTING, REPRODUCING, AND CREATING 3-DIMENSIONAL OBJECTS FROM DIGITIZED AND/OR PARAMETRIC DATA INPUTS USING COMPUTER AIDED DESIGN AND MANUFACTURING TECHNOLOGY

(76) Inventor: Daniel P. Sutula, Jr., 45A Grandview Dr., Farmington, CT (US) 06032

( * ) Notice: Subject to any disclaimer, the term of this patent is extended or adjusted under 35 U.S.C. 154(b) by 812 days.

(21) Appl. No.: 10/039,821

(22) Filed: Jan. 4, 2002

(65) Prior Publication Data
US 2002/0114537 A1    Aug. 22, 2002

(51) Int. Cl.
G06F 19/00    (2006.01)

(52) U.S. Cl. .................. 700/182; 700/98; 700/117; 700/118; 700/161

(58) Field of Classification Search ........... 700/182, 700/180, 118, 119, 159, 161, 166, 169, 95, 700/98, 117, 120; 264/401; 382/285
See application file for complete search history.

(56) References Cited

U.S. PATENT DOCUMENTS

| | | | | | |
|---|---|---|---|---|---|
| 4,469,930 | A | * | 9/1984 | Takahashi | 700/182 |
| 5,552,992 | A | * | 9/1996 | Hunter | 700/118 |
| 5,594,652 | A | * | 1/1997 | Penn et al. | 700/119 |
| 5,823,778 | A | * | 10/1998 | Schmitt et al. | 433/214 |
| 5,864,482 | A | * | 1/1999 | Hazama et al. | 700/182 |
| 5,910,854 | A | * | 6/1999 | Varaprasad et al. | 359/273 |
| 5,997,681 | A | * | 12/1999 | Kinzie | 156/263 |
| 6,027,324 | A | * | 2/2000 | Hull | 264/401 |
| 6,459,952 | B1 | * | 10/2002 | Dundorf | 700/182 |
| 6,473,671 | B1 | * | 10/2002 | Yan | 700/134 |
| 6,532,299 | B1 | * | 3/2003 | Sachdeva et al. | 382/128 |
| 6,648,640 | B2 | * | 11/2003 | Rubbert et al. | 433/24 |
| 6,804,568 | B1 | * | 10/2004 | Miyazaki et al. | 700/182 |

* cited by examiner

Primary Examiner—Leo Picard
Assistant Examiner—Charles Kasenge

(57) ABSTRACT

A high-technology method for creating, reproducing, and or precisely fitting custom appendages to topographically complex structures. The method comprises a combination of novel measurement techniques in conjunction with computerized modeling and machining processes applied to achieve a virtually perfect tailored fit with mating structures. The method does not require the physical presence of the mating structure so the modeling and machining operations may be conducted at a separate location based solely on parametric dimensional and/or graphical data inputs and a customized data form. Said data may be transmitted conventionally or electronically as by fax or the internet. The invention includes a printed virtual protractor tool (16) for accurately measuring angles. A means for direct digitization of the required topological data input is also provided. The novel aspects of this invention can be combined with conventional fitting equipment and processes. The scope of this invention is exceedingly broad with a variety of potential applications cited. Two examples are presented to illustrate utility in the context of complex operations routinely encounter by gunsmiths in fitting recoil pads (9) to gunstocks (23) and fitting sighting ribs (37) to gun barrels (42).

18 Claims, 12 Drawing Sheets

METHOD AND APPARATUS FOR PRECISELY FITTING, REPRODUCING, AND CREATING 3-DIMENSIONAL OBJECTS FROM DIGITIZED AND/OR PARAMETRIC DATA INPUTS USING COMPUTER AIDED DESIGN AND MANUFACTURING TECHNOLOGY

BACKGROUND OF THE INVENTION

1. Field of the Invention

The present invention relates to a novel high-technology method enabling precision creation and/or fitting of custom appendages to topographically complex two-dimensional and three-dimensional structures. The method comprises a combination of computerized tools and techniques employed to produce a virtually perfect fit with mating structures. The fitting method does not require the physical presence of the mating structure, and may be accomplished using only parametric dimensional and/or graphical data inputs that may be transmitted conventionally or electronically. If the mating structure is available, the method provides a means for direct digitization of the required topological data input. Novel elements of this method may also be used in conjunction with conventional fitting equipment and processes. The methods of this invention apply broadly to the general field of custom fitting appendages of all types. Two examples are presented to illustrate utility in the context of solutions to complex operations routinely encounter by gunsmiths, more particularly, in fitting recoil pads to gunstocks, and in fitting sighting ribs to gun barrels.

2. Related Art

There exist a countless number of applications that require elements or appendages to be custom fit to mating structures. Examples from range from a fierier fitting horseshoes, to the fitting of prosthetics limbs for handicapped people. Conventional methods typically require skilled technicians to manually form or machine the appendages to approximate a matching fit with the mating structure. Casting methods have been used extensively to capture and replicate the form-fit shape of mating structures and facilitate subsequent fitting by manual or mechanized duplication methods such as pantographs. In some cases the appendage can be fabricated directly from the cast material. While the number of fitting applications is too extensive to list, two examples have been selected to illustrate the utility of the methods of this invention in the fitting of appendages to complex three-dimensional structures. Moreover, these particular applications illustrate the advantages associated with fitting based on a combination of profile and parametric data inputs that are relatively easy to measure and record.

One example of the method of this invention involves an application wherein the process is used to facilitate fitting recoil pads or the like to guns. Recoil pads, butt plates, and spacers are commonly fitted to the butt stocks of long guns for the purpose of absorbing recoil, enhancing aesthetics, or to preserve or modify the fit of a gun by altering the geometry of the stock. Because recoil pads are typically thicker they accentuate the need for accuracy in fitting as a mismatched profile or angle will be readily apparent by creating an obvious surface discontinuity. The techniques used for fitting butt plates and spacers are essentially identical to the methods of fitting recoil pads.

There are a variety of reasons why recoil pads and butt plates should be replaced occasionally. The most common reason is due to the fact that the mechanical properties of most elastomers degrade with time and exposure to various environments and chemicals. Degradation of the elastomers can result in loss of elasticity, hardening, or embrittlement also known as dry rot. Many gun owners make the common mistake of storing their guns in a vertical orientation with the weight of the gun bearing on the recoil pads. Over time the pad may creep and deform into a distorted shape that no longer matches the contour of the stock and also reduces the ability of the pad to absorb energy.

In addition to the physical and chemical degradation of the pad, there are geometric situations that create the need to replace or refit a recoil pad. Any significant modification to the profile or position of the stock at the mating plane will disrupt the fit of the pad. For example, novice refinishers often remove the recoil pad in order to sand the stock in preparation for refinishing. In the process of sanding, the perimeter edges of the butt stock may be inadvertently rounded causing a mis-match of the recoil pad or butt plate to the stock. Subsequently, in an attempt to remedy this mistake, the stock may be cut or refaced in order to remove the rounded edges. Unfortunately, due to the taper of the gunstock the cutting operation will adversely change the fit. More commonly, stock alterations result from the intentional attempt to modify the dimensions or "fit" of the gun, or to preserve the original fit while adding a new recoil pad.

The unique and complex shape of the stock greatly complicates the fitting operations. The 3-dimensional shape of the typical butt stock can best be described as an asymmetrical frustum of a conic section. The perimeter edge of stock at the plane where the recoil pad is attached represents a complex two-dimensional profile with a unique ellipsoidal cross-section. This plane is typically flat as the result of a planar sawing operation. The multi-angular orientation and position of the butt plane defines a unique two-dimensional edge profile and three-dimensional adjacent surface contour.

Several recoil pad companies have marketed "pre-fit" recoil pads that are intended to fit the original contour of popular model guns. However, due presumably to loosely controlled manufacturing tolerances associated with both the gunstocks and the recoil pads, these pre-fit pads typically fit poorly. Moreover, if the original geometry of the stocks has been altered, pre-fit pads may not fit at all. For these reasons the majority of recoil pads are manufactured in the form of an oversize profile blanks intended for subsequent fitting of the pad to match the contour of the gunstock by sanding, grinding, abrading or other suitable material removal process hereafter referred to as machining.

The difficult task of conventionally fitting recoil pads to gunstocks is well known in the art and has necessitated the invention of many jigs, fixtures, methods, and specialized machinery. Most fixtures require the stock to be removed from the gun to facilitate handling dexterity and positioning of the stock. Removal of the butt stock itself may require the specialized tools and skills of a gunsmith. Conventional methods involve manually shaping the pad to a manually traced or scribed profile while the pad is held at the appropriate angles by a special jig or fixture. Topographical projections or discontinuities in the shape of the gunstocks such check pieces, and "stepped" or Monte-Carlo-type stocks, and protruding sling-swivel studs can interfere with the function of most conventional fitting methods. Pantograph type copy-milling or grinding devices have also been known to have be utilized for production and fitting of fit recoil pads. This process typically requires use of a "master" pattern such as a gunstock and/or recoil pad from which the new pad is reproduced.

In Pachmayr's U.S. Pat. No. 3,992,823, his mechanical apparatus facilitates the shaping of recoil pads to the stocks.

Pachmayr's machine uses complex mechanical kinematics to control the relationship between the cutter and the recoil pad using the stock or a profile template a guide. Pachmayr claims that the ideal universal pivotal center of movement of his invention mechanism should be positioned midway between the convergence points of the top and bottom and two side surfaces of the stock. While Pachmayr's machine is acceptably effective, it is also complex in design, construction, set-up, and operation. Moreover, his machine comprises an inherent inaccuracy associated with the adaptation of a universal pivot point to approximate the complex motion required to precisely contour a recoil pad to a true form.

It is also known in the prior art that simplified jigs similar to Pachmayr's have been manufactured and distributed by the B-Square Company, and by B&R Inc. These jigs require scribing a line and subsequently facilitate manually grinding of the pad to the scribed line at one or more guided angles approximating the tapers of the stock. The angles are used as guides and the areas between are manually and therefore inaccurately blended.

While conventional jigs may reduce the risk of accidental damage, they do not eliminate the risk of nicking or scratching the gun during the pad fitting operation. In many cases the potential for accidental damage or loss of their guns or gunstocks in the process of fitting, transportation, or shipping, is sufficient to deter otherwise needy gun owners from replacing butt plates or recoil pads. This "risk of damage factor" is especially prevalent in the case of rare and valuable guns. Therefore, the method of this invention, which does not require removal of the stock from the gun, or use of the stock for fitting of the recoil pad, is a tremendous advantage.

A second example of the method of this invention involves an application wherein the process is used to facilitate fabrication and/or fitting of sighting ribs to the barrels of guns. In many shooting sports and hunting applications, the barrel is used as a sighting aid for the shooter who aims by viewing down the top of the barrel. Unfortunately, the surface of an irregularly contoured barrel does not provide a beneficial line of sight for aiming. The line of sight of provided by a tapered barrel is not parallel to the axis of the barrel and can give the perception of aiming-low which will result in the common effect of shooting high. In an effort to improve the "sight picture", shotguns are frequently fitted with sighting ribs. The ribs provide a flat straight surface to aim down. The angle of the top plane of the rib with respect to the axis of the bore can be established in order to control the aim point.

The barrels of guns are typically tapered in a non-uniform contour. In order to minimize weight and maximize strength the wall thickness of a typical gun barrel is at a maximum around the chamber at the breech end, and decrease in thickness non-uniformly toward the muzzle. In the case of shotguns, the bore diameter also varies from chamber to muzzle most notably in the last two to six inches or "choke" which serves to focus the shot pattern. As a result of the complex geometry of the barrel, the operation of conventionally fitting and attaching a sighting rib to a barrel is very challenging.

Most ribs are permanently affixed to the gun barrel by means of solder, brazing, welding, or bonding. All of these methods of attachment require the precise machining of the rib to match the contour of the barrel in order to achieve an acceptable and consistent gap or bond-line. This can be a very difficult and time-consuming process using conventional measurement and manual machining methods.

Ventilated or vent rib have emerged as the most popular style rib. The lower section of a vent rib is intermittently scalloped out leaving a finite number of posts or piers for attachment to the barrel. The posts are typically very short, approximately one forth of an inch, in comparison to the scallops that are typically two to three inches long. Vent ribs are found on the majority of modern shotguns for several good reasons. The scallops or vents reduce weight and also help cool the gun barrel, which reduces the adverse optical effects of heat distortion. The reduced contact area also reduces the quantity and accuracy of the difficult machining required to fit the rib to the barrel.

Depending on the skill of the gunsmith, the resulting fit and finish of the ribs can vary greatly. Most gunsmiths neglect the effects of the barrel taper and machine each post to a straight average diameter at the center of the post. Alternately, they may machine a true cylindrical surface a slight taper angle relative to the axis of the barrel in an attempt to approximate the true irregular surface. Because of the extraordinary expertise and effort required, the cost of fitting a ribs is often not justifiable for the majority of guns which were not originally equipped with factory installed ribs. In the case of many mid-range and low cost guns, the cost associated with fitting a rib would often exceed the value of the gun itself. The efficiency and accuracy of the method of this invention will significantly reduce the cost of fitting ribs.

SUMMARY OF THE INVENTION

In the example wherein the method of this invention is applied to fitting a recoil pad to a gun, it is necessary to obtain an accurate profile and parametric description of the stock. Included in the methodology of this invention is a novel instruction and data acquisition form intended to facilitate collection and recording of all required measurements and geometric profile data. The form may also contain options style and fit options, which may be specified by the customer. For example, the customer could specify exact fit, oversize, or undersize tolerance preferences. Some of the requested data is redundant and may be used for reference or to verify the accuracy of critical measurements. A similar form is and method is provided for the other example wherein the method of this invention is applied to fitting sighting ribs to gun barrels.

The profile of the perimeter of the gunstock must be accurately traced, scribed, digitized, scanned, or otherwise graphically marked with any suitable means. It is desirable to use a fine point stylus to minimize tracing errors. Depending upon the width of the instrument used to trace, the profile must be determined and specified such that the proper adjustments may be made to "offset" the cutting contour. For example if a sharp needle or scribe point is used the offset may be negligible at only 0.005-0.010 inches. However, if a ballpoint pen or pencil is used the offset may be 0.015 inch or greater. The offset may be easily compensated for providing it is consistent and defined. Direct measurement of the principle axes can help verify the accuracy of the offset value and can be used to insure that no significant errors were introduced by the scaling or distortion error in the subsequent scanning, translation and modeling processes. Since most recoil pads are typically affixed with a pair of screws, it is also necessary to define the pad profile in relationship to the screws as datum points. The screw hole positions may be marked by tracing or by puncturing the trace film. Perhaps the best means to insure proper positioning is to use the screws to attach the profile template to the butt stock using any suitable material as a backer plate. Alternately, the trace film may instead be affixed to the butt stock using double stick tape or other suitable temporary adhesive. The trace film may be paper, vellum, foil, carbon paper, or any material suitable for making a distinguishable recording of the profile. Ideally, the trace material shall provide a high visibility line contrast for ease of scanning and shall be resistant to deformation and swell. While common paper may suffice, the a more suitable material would be more durable and resistant to swelling with humidity, such as photographic paper, plastic film, or thin sheet metal. Ideally the trace material would be coated so that the traced area could be scratched off to reveal a color contrasting substrate. Instead of tracing, the profile data may also be captured with a calibrated photographic, videographic, mechanical, or electronic digitizing means.

In addition to the profile and screw hole definition, the angle of the surface along the profile must be considered in order to properly fit the recoil pad to the stock. Theoretically, the edge angle varies continuously along the entire perimeter of the profile. However, for practical purposes, an accurate approximation can be made based on assumptions and a few representative measurements. One assumption is that the topology of the stock is smooth and continuous, and that the tangent angle at the edge is representative of the adjacent surface along the local length of the contour. In developing this invention, it has been determined that measuring the tangent angles at the top, bottom, left and right sides will yield a sufficiently accurate representation of the surface of the gun stock. Since the side angles of the stock are typically small ranging between one and three degrees, an average value such as two degrees may be assumed without significantly compromising the accuracy. If absolute accuracy is required or desired, the angle can be measured at additional points around the perimeter of the profile.

While angle gages or protractors are the traditional tools used for measuring angles, many prospective customers are not likely own one of these specialized tools. Moreover, most angle gages are made of metal that could scratch a gunstock accidentally. Thus, in yet another novel aspect of this invention, a method of fabricating a disposable angle gage, comparator, or protractor type device is provided. The paper comparator could be made available in conventional format or a computer file, which could be printed. The angle gage comparator, consists of an angular array of lines could be approximated, cut, compared, and re-cut, until the precise matching angle is determined. The gage could be reused to measure successively larger angles. Thus, the method provides an effective and economical virtual tool that will not scratch a gun.

The traced profile data can be scanned or digitized using any suitable means including an optical scanner. The resulting electronic image may be used directly or may be subsequently filtered in order to enhance the fidelity of the data. The profile may be converted into a standard CAD graphics format or may be imported directly into a CAD program where a single or series of elements may be used to approximate the profile. This may be accomplished using, interpolation splines, biezer or b-splines, flines, arcs, or point data elements. This conversion process can be done manually or may be automated via programmed routines or macros.

Once the original or primary 2-d profile s modeled in the computer, a secondary profile must be created at a sufficient offset distance, typically a few inches, from the original profile. Due the multi-angular taper, the size and shape of the secondary profile must change as a function of the distance from the surface of the primary profile. The surface contours may be simultaneously converging and/or diverging in accordance with the directions defined by the side angle measurements. Thus, the secondary profile must be variably rescaled in multiple dimensions in order to comply with the spatial envelope defined by all of the taper angles. A surface can then be created between the primary and secondary profiles by lofting or any other suitable surface modeling techniques. The resulting three-dimensional surface is representative of the side surfaces of recoil pad. The mathematical definition of the surface may be in any suitably accurate form such as NURBS, planer facets, wireframe, or point cloud data. The entire process of converting the parametric and 2-d profile geometry to a 3-d computerized model can be easily automated into a single operation driven by only the profile and parametric data.

To facilitate automation of this modeling process, the digitized edge profile can be resolved into a discrete quantity of control points as either at a specified density or by an automatic and intelligently calculated density based on a specified deviation tolerance and the rate of curvature of the profile. For example by using the computer programming architecture known as OLE, which is the acronym for object liking and embedding, the array of individual control points could be automatically linked or associated to the 2-d splines. The secondary profile spline could be automatically repositioned and variably rescaled based on the specified side angle parameters. Thus the creation of the three dimensional surface would be driven directly by the input geometry and parameters.

The modeled surface data can be imported and used to program numerical control or NC toolpath in order to cut the pad to the desired shape. Modern computer aid machining or CAM packages provide a number of suitable machining strategies, which facilitate efficient removal of material. The CAM program must calculate and output unique toolpath for each unique pad. The CAM software can be automated in order to facilitate easy importing of geometry and automatic calculation of toolpaths. To maximize cutter efficiency, it is desirable to know the initial size of the blank pad. The sizes of the available blanks could be stored in a data library for user specification and automatic consideration in calculation of the toolpath. An inherent advantage of CNC machining is that complex shapes can be cut with a cutter of common shape and size by programming precisely close cuts.

Since most recoil pads are rubber, and rubber is not particularly easy to machine, there are several machining techniques which may be employed to improve the cutting efficiency. For example, the material may be cooled to a temperature where it more workable. The tool cutter may be any suitable type including but not limited to the following; end mill, burr, bit, grinding stone or wheel, abrasive belt, hot wire, band-saw, water-jet, abrasive water-jet, laser, or blade.

The computer numerical control or CNC may be programmed in 2½-5-axis motion. The term "undercut" is typically used to describe an area that is not directly machinable from a given axis, due to interference or overhang of another region of the part. The simultaneous combination of converging and diverging taper often creates undercut geometry in recoil pads. While is may be advantageous to use 4-axis or 5-axis machines to reach these undercut regions, there are simpler methods. By using a convex tool with a suitably smaller shank, undercuts may be reached from a common axis such as the z-axis in a conventional three-axis milling or routing operation. Alternately, the recoil pad may be fixtured on an incline angle to permit access to what would otherwise be an undercut region.

In another example wherein the method of this invention is applied to achieve a systematic means for determining, recording and modeling the unique three-dimensional contours required for precisely machining ribs for a perfect fit with gun barrel. The method of this invention provides a means for parametric measurement of the gun barrel at incremental and/or specific points along the length of the barrel. Assuming the axis of the barrel is straight, a computer model of the barrel can be recreated in order to closely approximate the tapered contour. Although the barrel diameter at a given position along The contoured surface can be used to define a mating surface on the vent rib blank, which can in turn be used to program the CNC code required to precisely machine the rib.

Because this invention provides a convenient and complete means for remote data collection, the gun barrel need not be removed from the gun, or transported to the gunsmith for fitting. The data can be mailed, e-mailed, faxed or phoned to the gunsmith who can in turn deliver a perfectly fit rib without ever having seen or touched the barrel. The user can then bond or solder the rib to the barrel themselves or they may bring the gun to a local gunsmith for completion of this task. Many gunsmiths have the means and skill required for attaching ribs but lack the capabilities to perform the fitting operations.

The method of this invention may also be applied in numerous other applications. For example: manufacturing and fitting custom horseshoes, custom fit clothing, helmets, prosthetics, etc.

BRIEF DESCRIPTION OF THE DRAWINGS

The methods, advantages and features of this invention will become more clearly apparent from the following description of several embodiments of the invention, given as non-restrictive examples only and represented in the accompanying drawings in which.

DETAILED DESCRIPTION OF THE
INVENTION AND PREFERRED
EMBODIMENTS THEREOF

Figure 1:
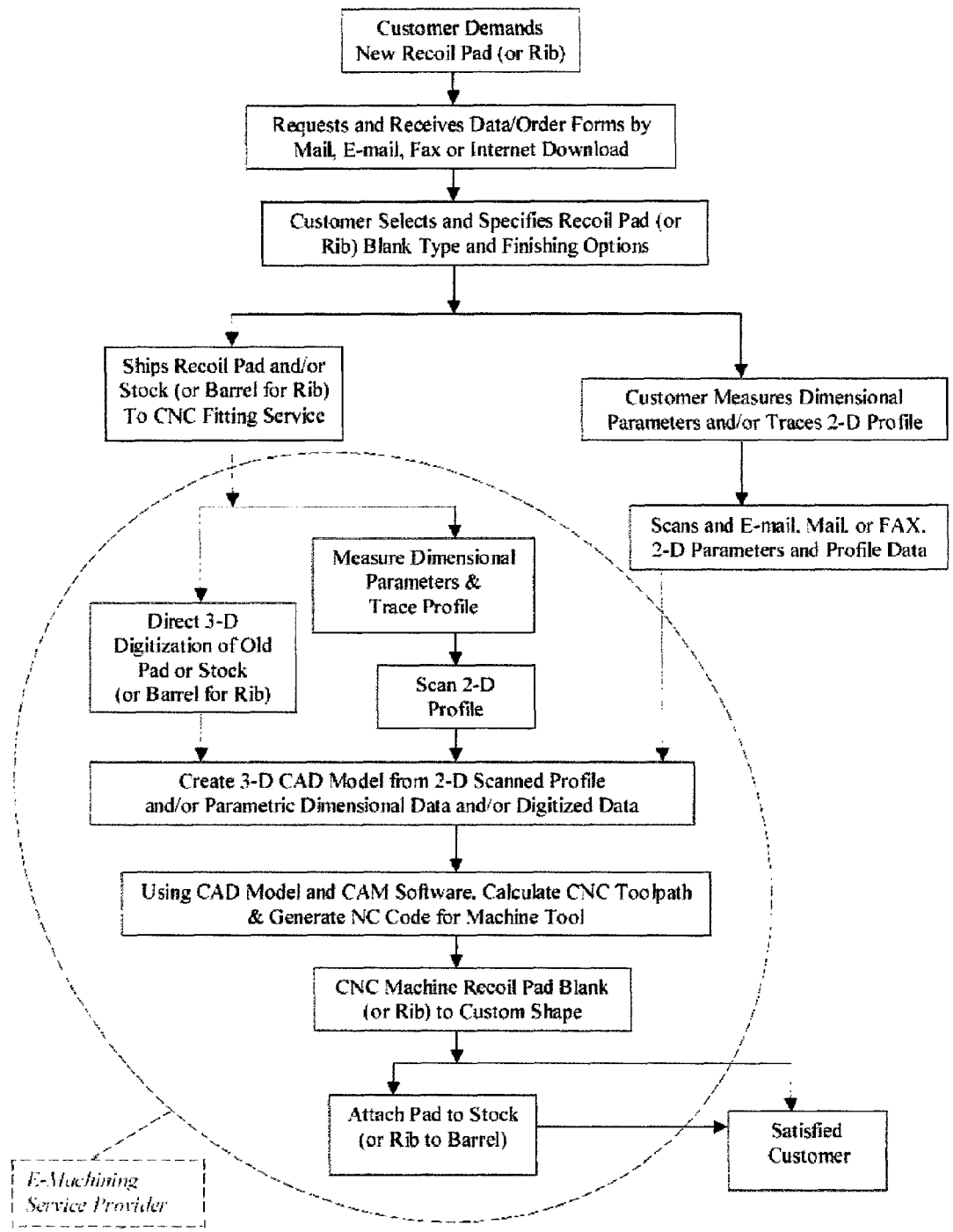
FIG. 1 represents a flow chart outlining combinations of steps that comprise the method of this invention. The flow chart delineates the roles of the customer and e-machining service provider from conception to completion.

FIG. 1 shows a flow chart outlining combinations of steps, which comprise the method of this invention. The flow chart starts with the customer who needs or wants a new recoil pad. The customer may request the appropriated data and order forms from the e-machining service provider either by mail, phone, fax, or e-mail. The customer may also download the forms directly from the ESP's internet web site. The customer must then select the type or style recoil pad they desire, along with their preferences with regard to the final size and surface finish. For example some may prefer a slightly oversized or undersized pad instead of an exact fitting pad. The customer must then decide whether they are going to take the measurements themselves or leave this task to the ESP. If the customer elects to take measurements themselves, they must transmit the data to the ESP by mail, fax, or by e-mailing the data along with a scanned image of the butt profile. Alternately, the customer may elect to ship the stock or recoil pad to the ESP who will either take measurements or digitize the required data directly from the 3-D object. Once the ESP has all the required input data, they will create a 3-D CAD model of the recoil pad base on either the digitize representation of the original recoil pad or by an extrapolated continuation of the surfaces of the gunstock. The 3-D CAD surfaces will subsequently be used to calculate the precise path of the cutting tool required to achieve the fitted shape by machining material from the oversized blank. Thus, the ESP can deliver a precise fitting recoil pad with or without the having the mating structure. If the ESP has the stock, they may attach the fitted pad to the stock. Otherwise, the ESP would ship the pad to the customers who would attach the pad themselves.

Figure 2:
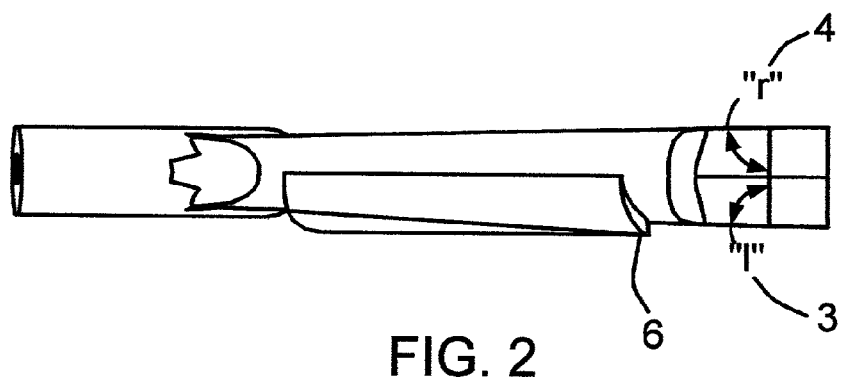
FIG. 2 is a top view of an assembly comprising a monte carlo style gunstock with cheekpiece and a recoil pad.

FIG. 2 is a top view of an assembly comprising a monte carlo style gunstock with a cheekpiece feature and a recoil pad attached. This view illustrates the two side taper angles 3 and 4 on the left and right sides respectively. It can be seen that the presence of a protruding cheekpiece 6 can disrupt the contour of the stock near the recoil pad thereby complicating the fitting by conventional means.

Figure 3:
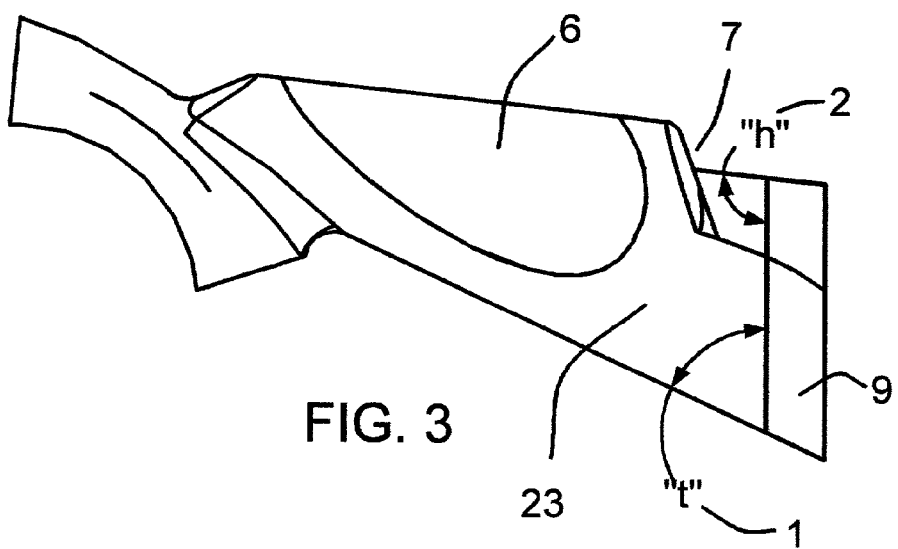
FIGS. 3 & 4 show the left side and rear views of the gunstock and recoil pad assembly respectfully.

FIG. 3 shows the left side of the gunstock and recoil pad assembly. The term monte-carlo is used to describe the step feature 7 in the stock. The taper angles at the "heel" 2 and "toe" 1 of the stock are shown. It can be seen that the surface discontinuity caused by the monte-carlo step also complicate fitting of the recoil pad 9 using conventional methods.

Figure 4:
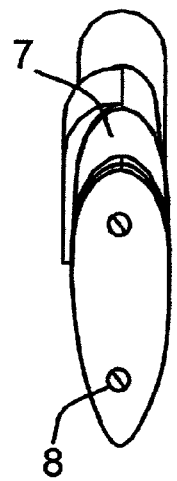

FIG. 4 show the rear views of the gunstock wherein the recoil pad is typically attached using screws 8. The stepped "monte carlo" feature 7 is apparent in this view.

Figures 5, 6:
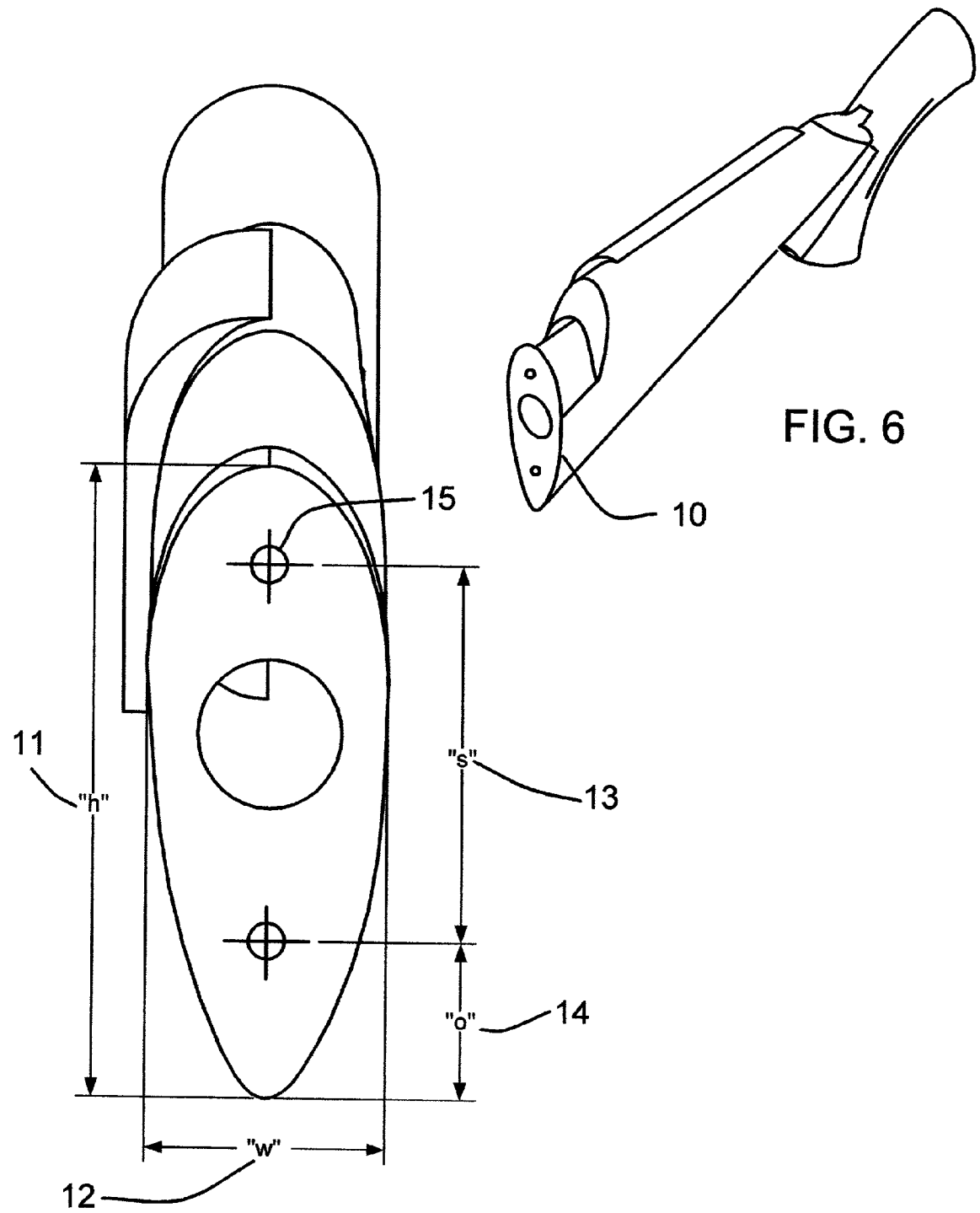
FIG. 5 is a view perpendicular to the rear of the gunstock without the recoil pad.
FIG. 6 is an isometric view of the gunstock without the recoil pad.

FIG. 5 is a view perpendicular to the rear of the gunstock without the recoil pad. The height 11, width 12, and screw locations 13 and 14 are critical dimensions required for the fit. While this dimensional information may also be determined to from the traced profile, the dimensions serve to verify the exact dimensions and may facilitate in compensating for errors associated with tracing, scanning, digitizing, or translation of the data.

FIG. 6 is an isometric view of the gunstock in which the perimeter profile 10 of the butt is indicated.

Figure 7:
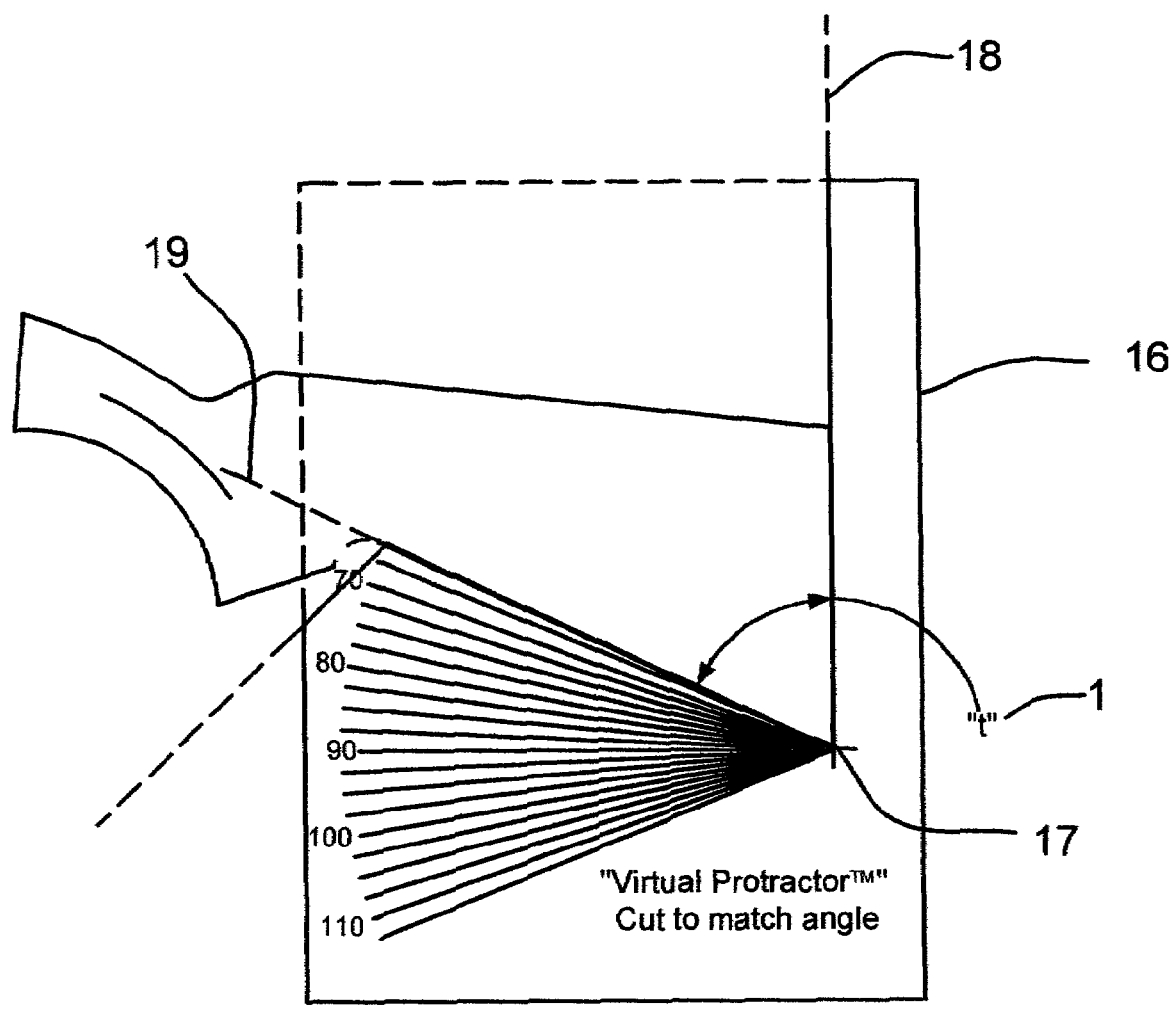
FIG. 7 shows a left side view of typical gunstock wherein the bottom "toe" angle is being measured using the "Virtual Protractor" method of this invention.

FIG. 7 shows a left side view of a typical gunstock wherein the bottom "toe" angle 1, positioned at the origin of the protractor 17, is being measured using the "Virtual Protractor" method of this invention. The "Vertical Protractor" 16 may be printed out on paper or other suitable sheet stock and subsequently trimmed along the dotted lines that represent the datum angle 18, and the measured or matching angle of the stock 19. Graduations on angled lines indicate the exact angular measurement. By measuring the smaller angles first, a single "Virtual Protractor" may be re-used to measure multiple successively larger angles.

Figure 8:
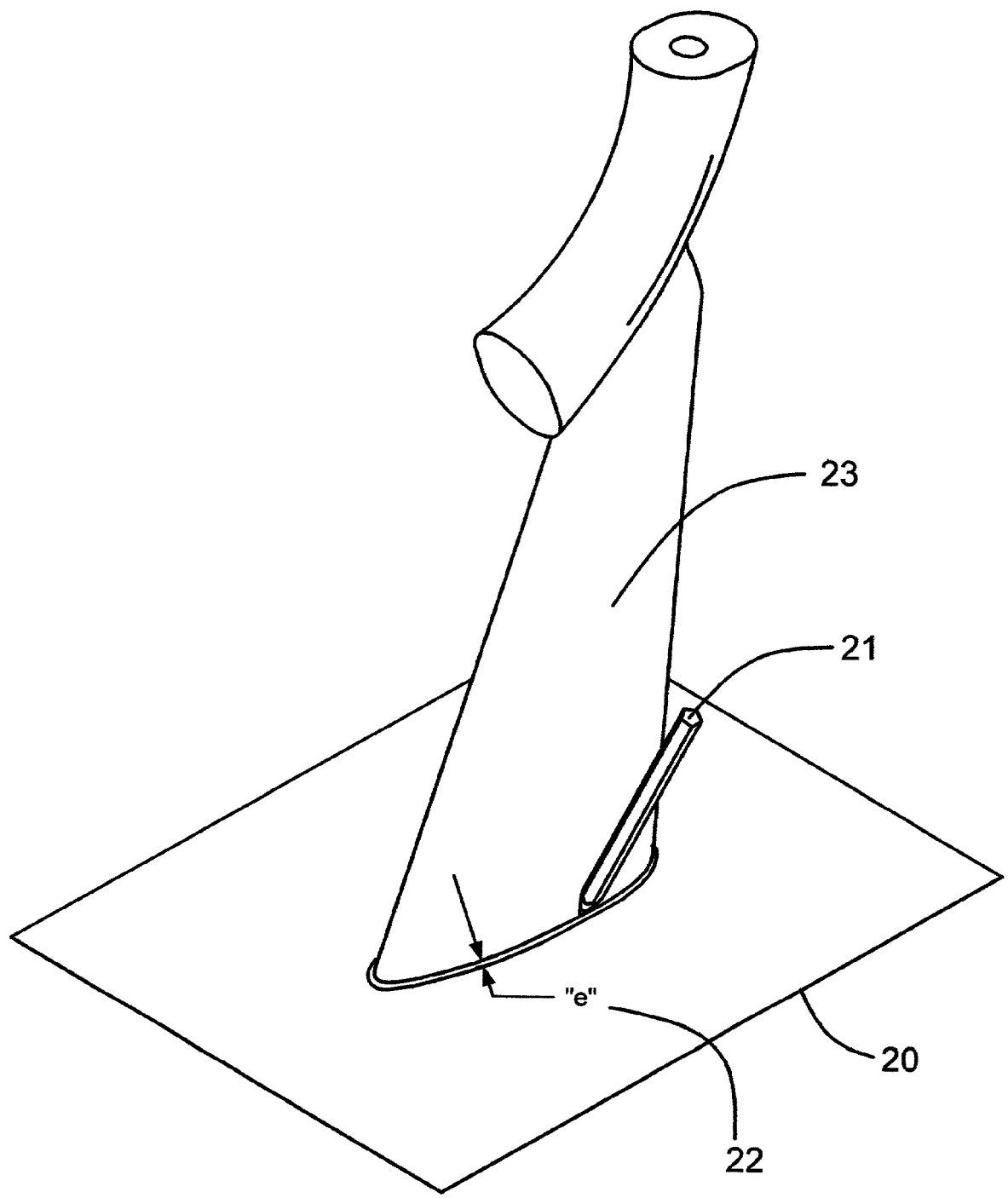
FIG. 8 shows an isometric of the gunstock in a vertical orientation wherein the profile of butt plane is being traced on a sheet of paper with a pencil.

FIG. 8 shows an isometric of the gunstock 23 in a vertical orientation wherein the profile of butt plane is being traced on a sheet of paper 20 with a pencil 21. Depending on the thickness of the tracing instrument, the traced profile may be larger than the actual profile of the stock. This offset error 22 can be estimated or measured and recorded for subsequent compensation.

Figure 9:
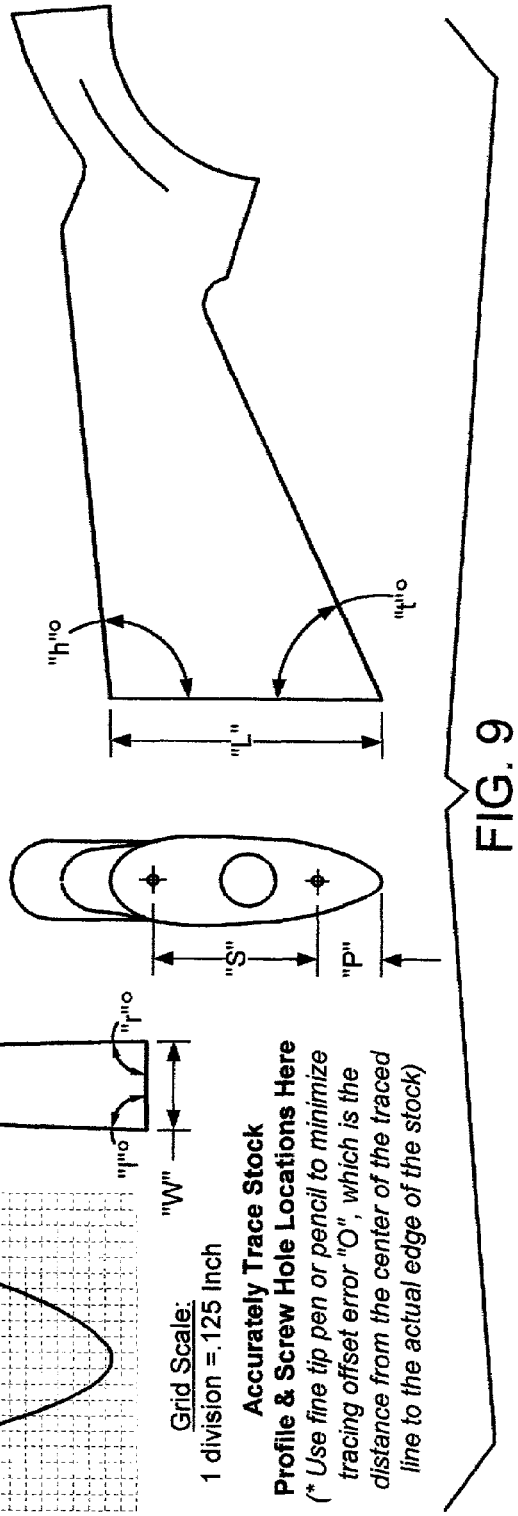
FIG. 9 is an example of a copyrighted data acquisition form of the type that could be used to capture all of the profile and parametric data required to fit a recoil pad to a gunstock in accordance with the method of this invention.
Figure 9:
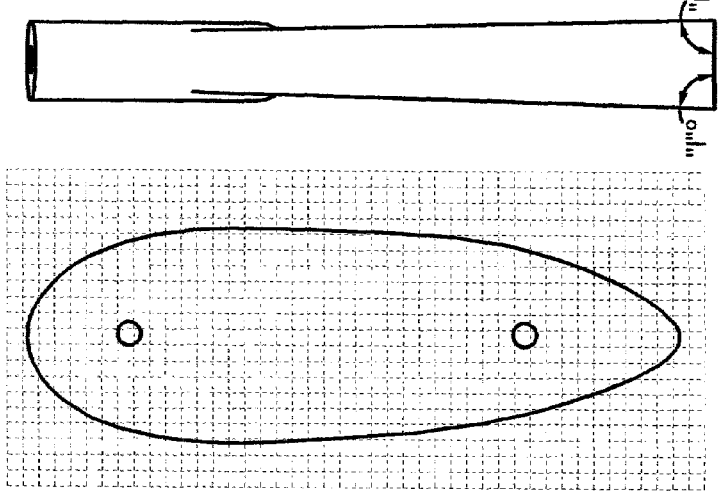

FIG. 9 is an example of a copyrighted data acquisition form of the type that could be used to capture all of the profile and parametric data required to fit a recoil pad to a gunstock in accordance with the method of this invention.

Figure 10:
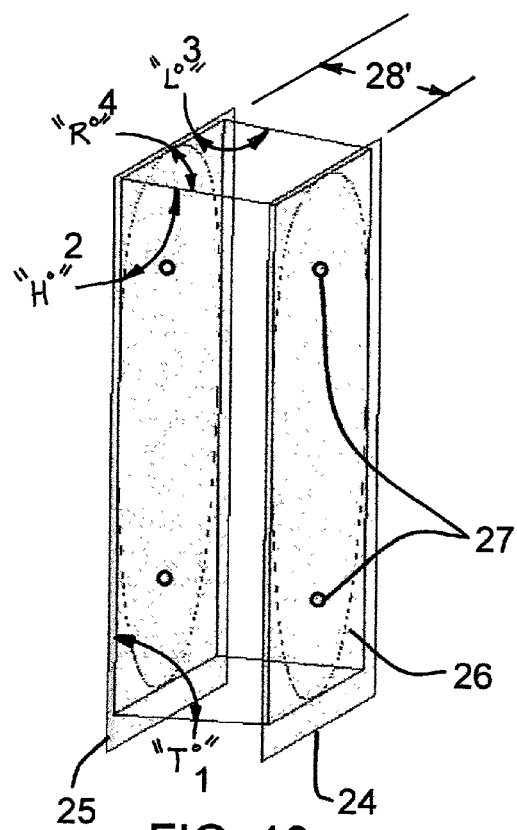
FIG. 10 is an isometric view illustrating a preliminary step in the construction of a CAD model of the recoil pad using a digitized representation of the trace profile data and extrapolated trace profile are used in conjunction with a reference block constructed at the appropriate parametric stock angels.

FIG. 10 is an isometric view illustrating a preliminary step in the construction of a CAD model of the recoil pad. After being scanned, and rescaled if necessary to compensate for tracing errors, the actual-size digitized image 24 is used as the foundation for the subsequent creation of virtual recoil pad model. The digitized image contains both the profile representation 26 and the screw hole representations 27. A rectangular construction box 28 may be used to assist in visualization and changing size of the continuation of the side surfaces at the appropriate "heel" 2, "toe" 1, left 3, and right 4, side angles respectively. The length or extrapolation distance 28' is non-critical and need only be slightly longer than the actual thickness of the recoil pad.

Figure 11:
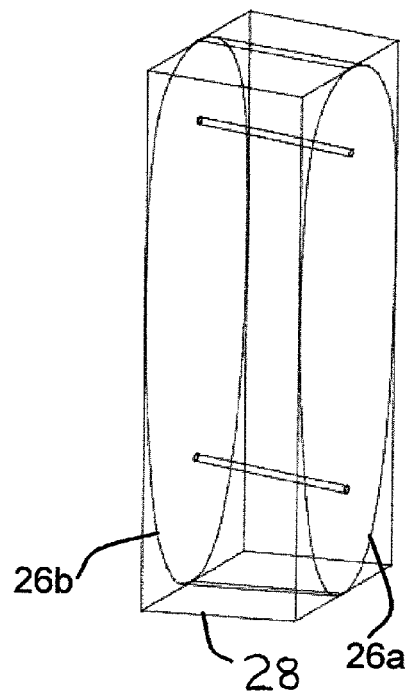
FIG. 11 is and isometric view illustrating a CAD model of the recoil pad wherein the trace data has been converted to mathematical spline representations and which have been used to created a lofted nurbs surface model of the exterior of the recoil pad.

FIG. 11 is and isometric view illustrating a CAD model of the recoil pad wherein the trace data has been converted to mathematically fitted spline 26a. The secondary trace profile is a derivative of the primary profile and spline that has been resized and repositioned in both the major and minor axes to accommodate for the changes resulting from the corresponding taper angles. Please note that the resizing and repositioning operations can be mathematically defined and can therefore be automated as a function of the taper angle parameters. The primary spline 26a and secondary spline 26b can then be used to create a lofted nurbs surface model of the exterior of the recoil pad.

Figure 12:
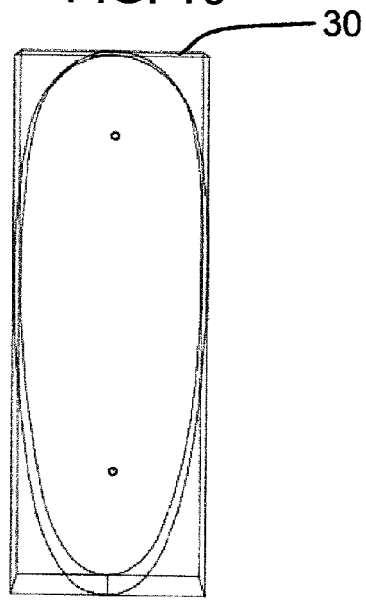
FIG. 12 is a rear view of the CAD model of the recoil pad and reference geometry.

FIG. 12 is a rear view of the CAD model of the recoil pad and reference geometry. This view serves to illustrate a case that if all the taper angles are not consistent in either an increasing or decreasing directions an undercut or surface inflection can occur. The severity of this undercut condition can limit access to the surface with a conventional 3-axis machining operation and straight shank tooling. The machining of undercuts can be achieved by fixturing at inclined orientations or multiple set-ups. Reduced shank and convex cutters may be used to gain access to the undercut areas. Ideally, a four or five axis machining capability will eliminate complications arising from undercut geometry.

Figure 13:
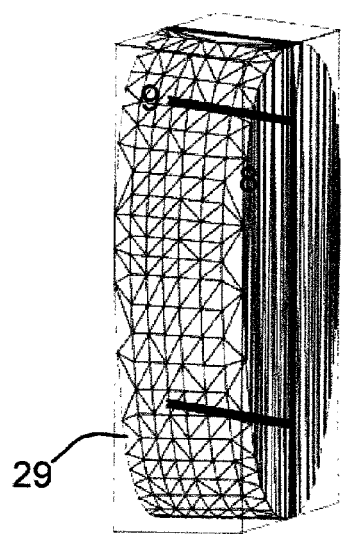
FIG. 13 is an isometric view of the CAD model of the recoil pad wherein the nurbs surfaces have been converted to a triangulated mesh of small planer surfaces.

FIG. 13 is an isometric view of the CAD model of the recoil pad wherein the smooth nurbs surfaces have been converted to a finite mesh of small planer surfaces 29. While surface faceting is not required or advantageous it is used here to illustrate the presence and continuity of the external surface contour.

Figure 14:
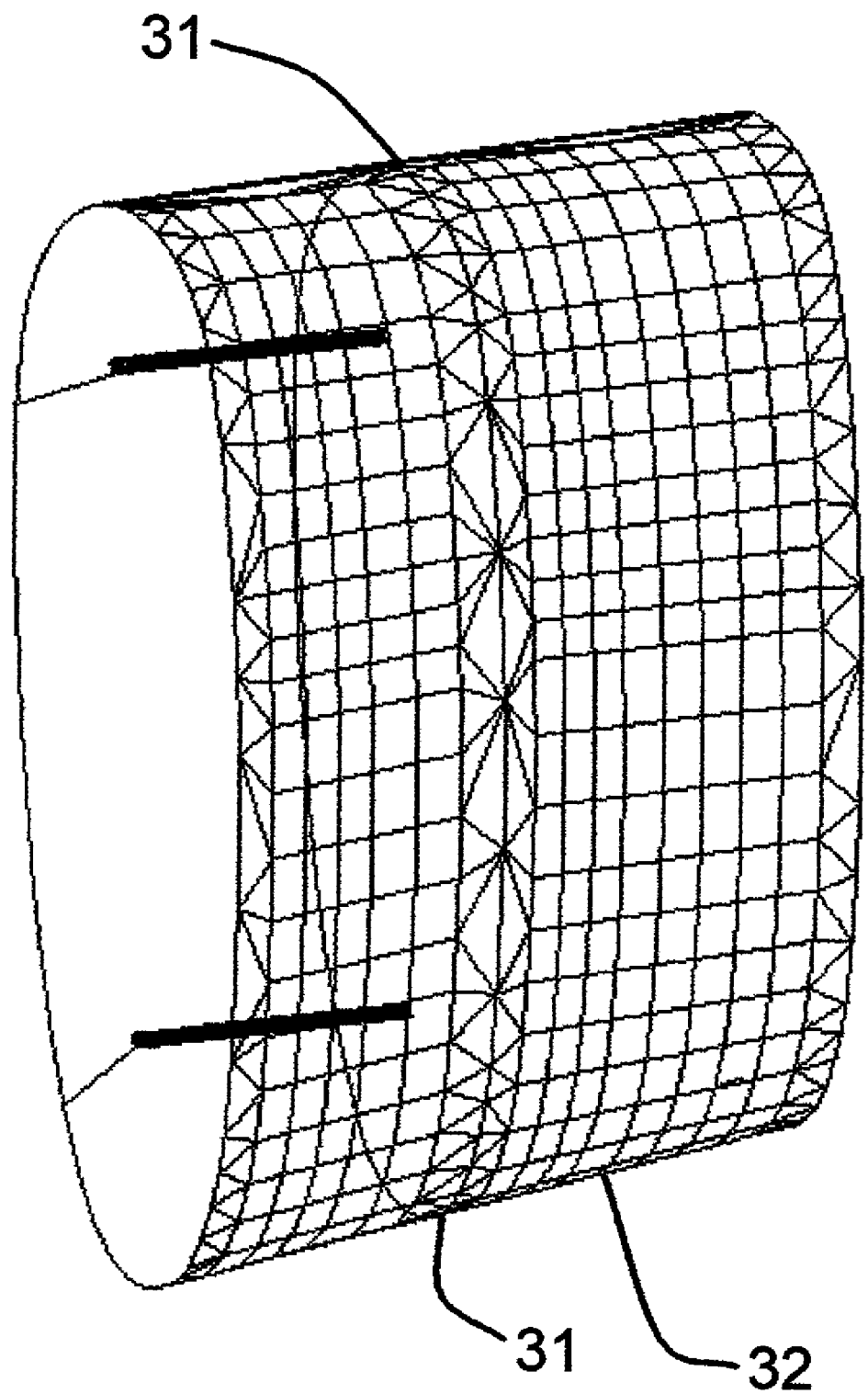
FIG. 14 is an isometric of the CAD model of the recoil pad adjacent to a CAD model of the gunstock.

FIG. 14 is an isometric of the CAD model of the recoil pad adjacent to a CAD model of the gunstock. Again, the faceted surfaces are used to illustrate the continuity of the modeled surfaces of the recoil pad where they meet the gunstock 32 along the edge of the butt profile 31.

Figure 15:
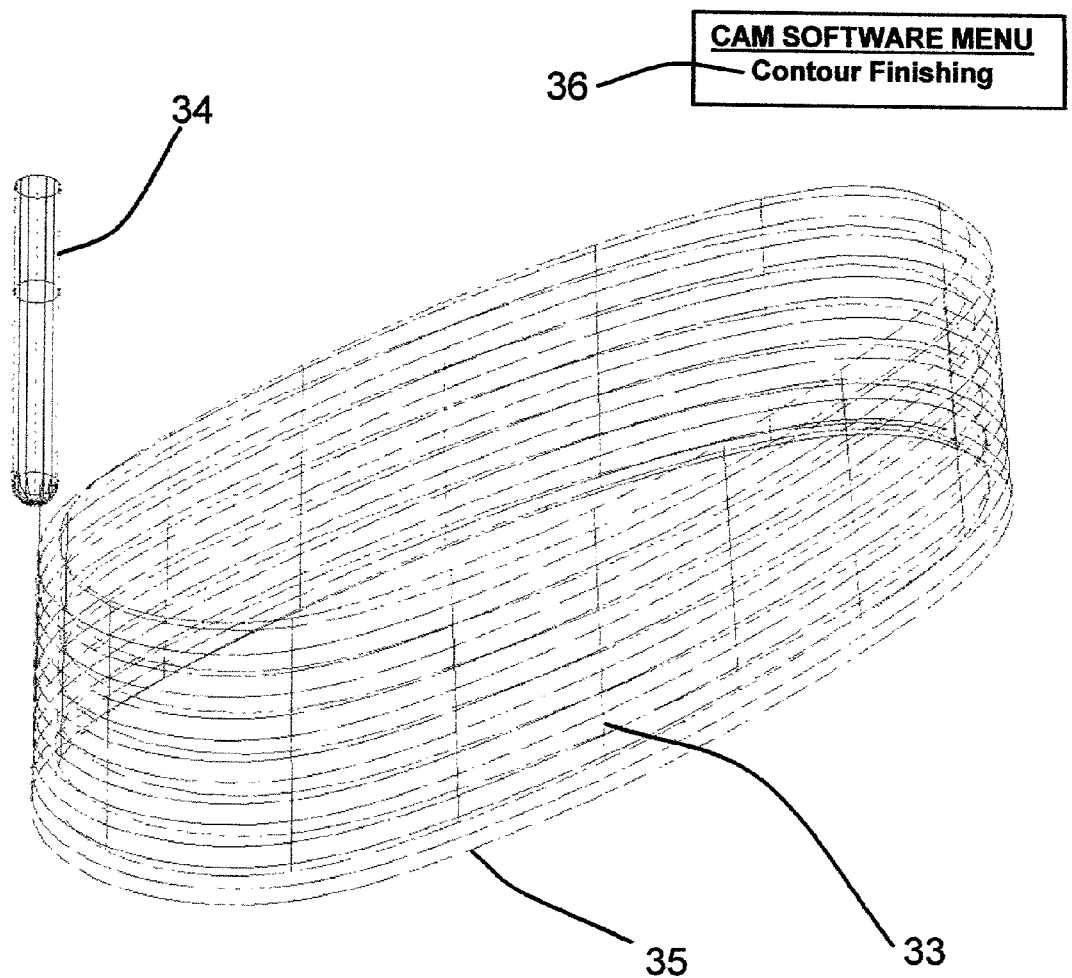
FIG. 15 is a view of a computer screen wherein a CAM (computer aided machining) program has been use to calculate the precise path of a cutting tool based on the CAD model of a recoil pad and selecting machining strategies.

FIG. 15 is a view of a computer screen wherein a CAM (computer aided machining) program has been use to calculate the precise path 35 of a cutting tool 34 based on the CAD model of a recoil pad 33 and selecting machining strategies 36. In this example, a spherical or ball-nosed end mill is depicted. Thus, the side and end section of the cutter are used to machine the recoil pad using a "contour finish" strategy wherein the cutter follows the contour of the part at a specified number of depth levels. Please note that there are a variety of machining strategies that can be used to achieve a similar result.

Figure 16:
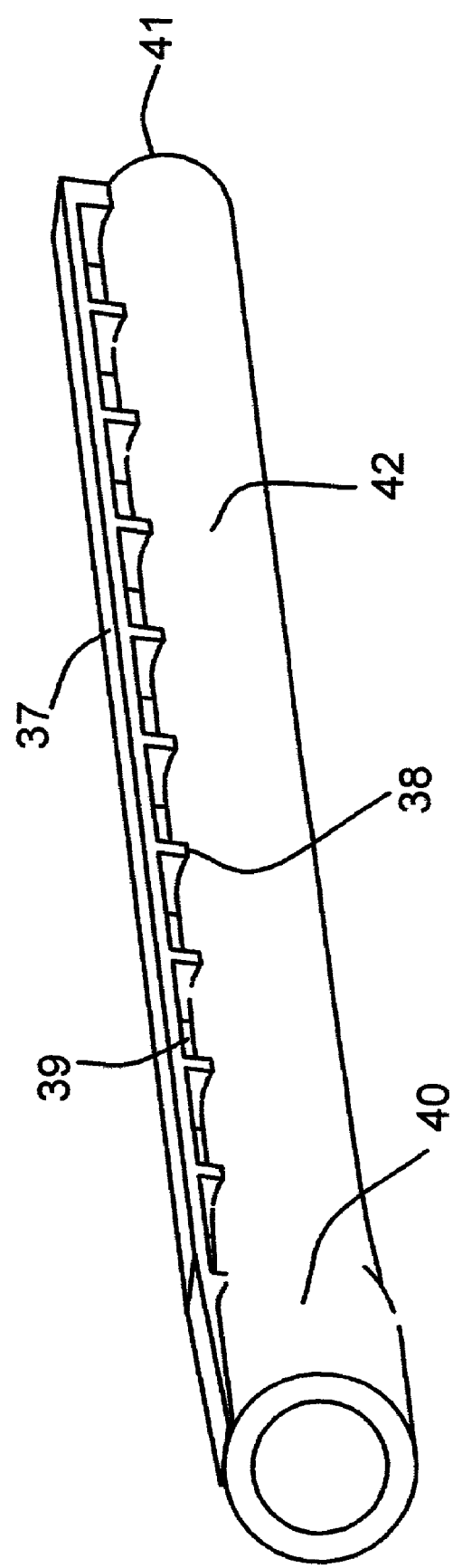
FIG. 16 is an isometric view of a typical shotgun barrel that has been fitted with a ventilated sighting rib by means of a method that comprises an alternate embodiment of this invention.

FIG. 16 is an isometric view of a typical shotgun barrel that has been fitted with a ventilated sighting rib 37 by means of a method, which comprises an alternate embodiment of this invention. The sighting rib consists of a series of cutouts or vents 39 and posts or pillars 38. Since the barrel tapers between the chamber 40, the choke 42 and the muzzle 41, it is necessary to individually fit the each of the pillars to match the contour of the barrel.

Figure 17:
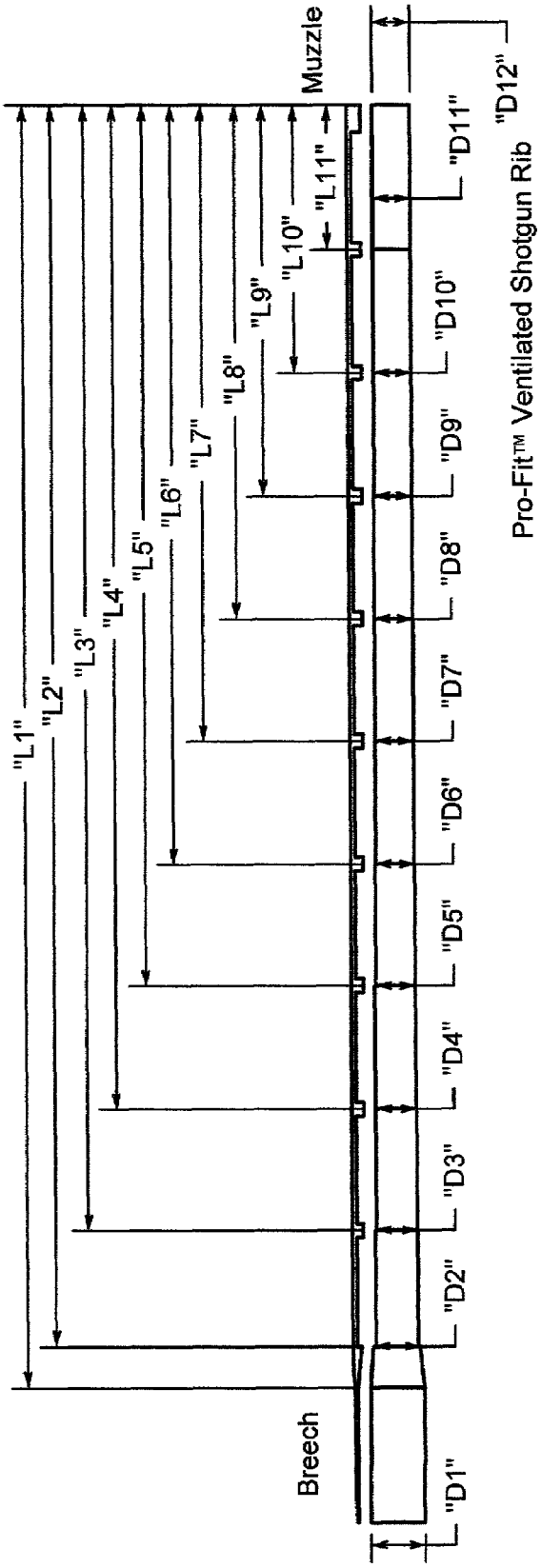
FIG. 17 is an example of a copyrighted data acquisition form of the type that could be used to capture all of the required profile and parametric data to fit a sighting rib to a gun barrel in accordance with the method of this invention.

FIG. 17 is an example of a copyrighted data acquisition form of the type that could be used to capture all of the required profile and parametric data to fit a sighting rib to a gun barrel in accordance with the method of this invention. While the diameter measurements are shown at the coincident locations of the posts of the rib, the method of this invention does not require these points to be coincident. In fact, the method of this invention provides a means for creating a fully contoured model of the entire barrel based on number of parametric measurements. Alternate to measuring a series of diameters, the contour of the barrel can be defined by series of height measurements from a common reference such as the axis of the bore or the plane of the top of the guns receiver. While measurement of the diameters is typically the most convenient method is does assume that the barrel of the gun is straight which is not always the case. If the barrel and a 3-d digitizing means are available the contour definition of the barrel can be made by capturing a line-scan down the length of the barrel or by capturing any number of point defining the complete surface. Again in the former method assume that the barrel is straight and all sections are circular in cross-section.

Figure 18:
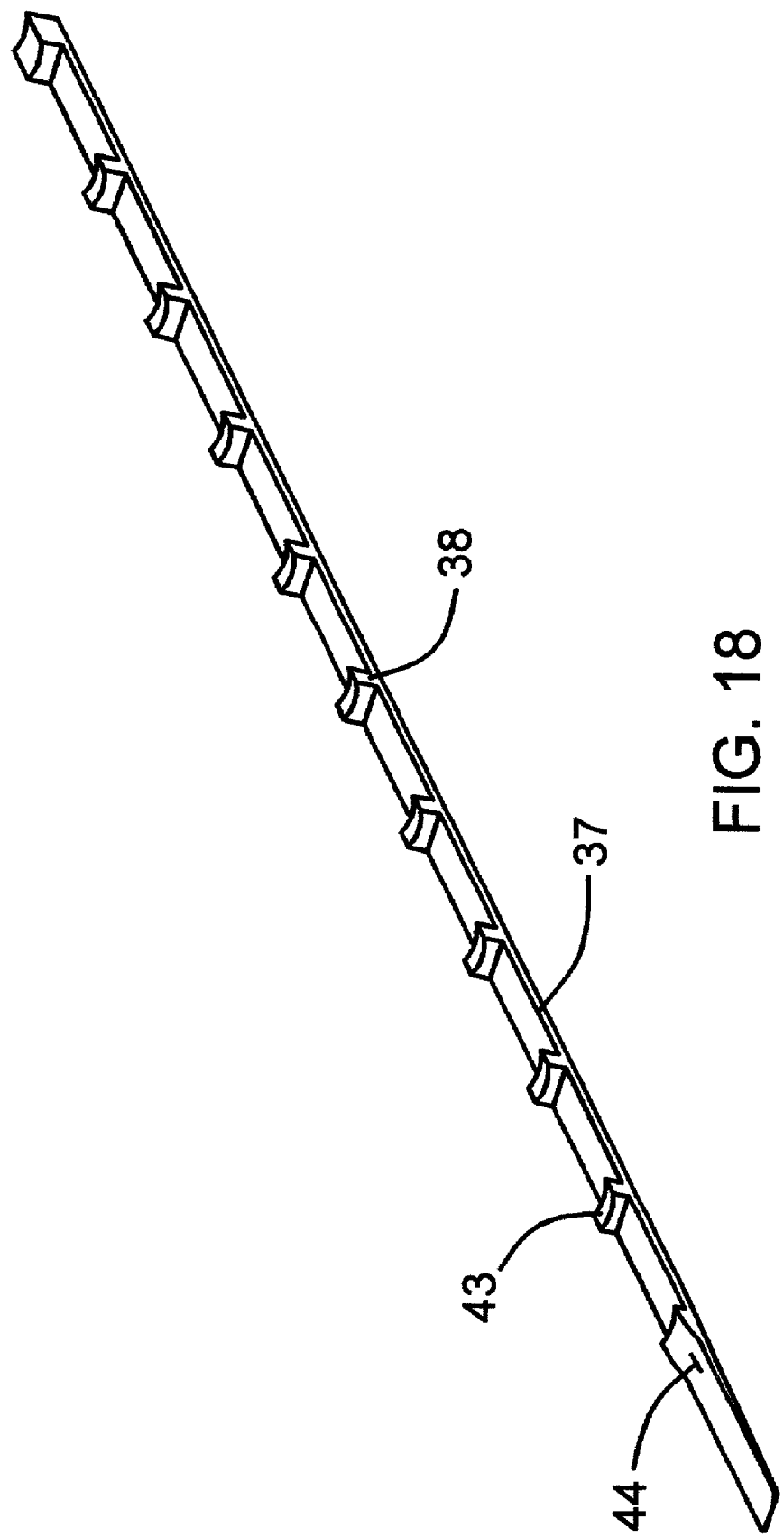
FIG. 18 is an isometric view of a CAD model of a sighting rib for a gun wherein the all surfaces of the rib have been precisely modeled to match the contour of the gun barrel.

FIG. 18 is an isometric view of a CAD model of a sighting rib 37 for a gun shown in an inverted orientation wherein the surfaces 43 of the rib posts 38 have been precisely modeled to match the contour of the gun barrel. The surface 44 depicts the region where the rib is contour to match the chamber section of the barrel. The machining of the rib blanks can be approached in any variety of suitable strategies ranging from programming and machining to a single continuous surface to individually machining each post.

While the invention has been described in detail with reference to particular embodiments thereon numerous variations to the specific embodiments nonetheless lie within the scope of the present invention.

I claim:

1. A method enabling the precise creation, fitting, and reproduction of objects, comprising the steps of:
   1) defining a single 2-dimensional profile representation of an object;
   2) measuring values from the object and defining a sufficient number of parametric values, comprising angular dimensions and/or linear dimensions and/or point coordinates, wherein the sufficient number of parametric values are derived from the measured values and characterize how the object changes in cross-section in 3-dimensional space with respect to the 2-dimensional profile of step 1;
   3) converting the profile and parametric values into an electronic format suitable for input to computer aided design and manufacturing (CAD/CAM) programs;
   4) creating a virtual CAD model from the profile and parametric values;
   5) calculating Numerical Control (NC) motion commands from the CAD model using CAM technology;
   6) processing an object using Computer Numerical Controlled (CNC) machine; and,
   7) transmitting data throughout the process, enabling theses steps to be conducted at any combination of geographic locations.

2. The method of claim 1, wherein step 1 comprises a tracing technique to define the 2-dimensional profile.

3. The method of claim 1, wherein step 1 comprises a digitizing device to define the 2-dimensional profile.

4. The method of claim 1, wherein step 1 comprises an optical scanning process to define the 2-dimensional profile.

5. The method of claim 1, wherein step 1 comprises exposure to a reactive chemical media, to define the 2-dimensional profile.

6. The method of claim 1, wherein step 1 and step 2 comprise a digitizing device to define the 2-dimensional profile and 3-dimensional parametric values.

7. The method of claim 1, wherein step 2 is facilitated by means of printed measuring utensils that may be used to provide accurate measurement of parametric values in the absence of conventional measuring equipment.

8. The method of claim 1, wherein step 1 and step 2 are facilitated by means of an integrated instruction and data acquisition form on which the profile and parametric values are defined and recorded.

9. The method of claim 1, wherein step 3 comprises converting the profile and parametric values by means of optical scanning technology.

10. The method of claim 1, wherein step 6 comprises processing by cutting, grinding, and/or sanding by means of a CNC controlled machine with a rotating tool.

11. The method of claim 1, wherein step 6 comprises processing by cutting or otherwise removing material by means of a CNC controlled machine with a water and/or abrasive media cutting jet.

12. The method of claim 1, wherein step 6 comprises processing by cutting by means of a CNC controlled machine with a cutting wire.

13. The method of claim 1, wherein step 6 comprises processing by cutting by means of a CNC controlled machine with a cutting laser.

14. The method of claim 1, wherein step 6 comprises processing by means of an additive material deposition process enabled by a CNC controlled Rapid Prototyping machine capable of directly producing a part.

15. The method of claim 1, wherein step 7 comprises data transmitted electronically.

16. The method of claim 1, wherein step 7 comprises data transmitted over the Internet.

17. The method of claim 1, wherein any combination of steps 1-7 may be combined consolidated and/or automated.

18. An apparatus enabling the precise creation, fitting, and reproduction of objects, comprising:
   1) a means of defining a 2-dimensional profile representation of an object's edges;
   2) a means of measuring values from the object and defining a sufficient number of parametric values, comprising angular dimensions and/or linear dimensions and/or point coordinates, wherein the sufficient number of parametric values are derived from the measured values and characterize how the object changes in cross-section in 3-dimensional space with respect to the 2-dimensional profile of step 1;
   3) a means of converting the profile and parametric values into an electronic format suitable for input to computer aided design and manufacturing (CAD/CAM) programs;
   4) a means of creating a virtual CAD model from the profile and parametric values;
   5) a means of calculating Numerical Control (NC) motion commands from the CAD model using CAM technology;
   6) a means of processing an object using Computer Numerical Controlled (CNC) machine; and,
   7) a means of transmitting data throughout the process, enabling theses steps to be conducted at any combination of geographic locations.

* * * * *